(12) United States Patent
Nakamura et al.

(10) Patent No.: US 8,359,742 B2
(45) Date of Patent: Jan. 29, 2013

(54) METHOD OF MANUFACTURING A SEGMENTED METALIZED GASKET

(75) Inventors: Takashi Nakamura, Okayama (JP); Hiroshi Izuta, Okayama (JP); Tetsuhito Akaishi, Okayama (JP)

(73) Assignee: Uchiyama Manufacturing Corp., Enami, Okayama-shi, Okayama (JP)

( * ) Notice: Subject to any disclaimer, the term of this patent is extended or adjusted under 35 U.S.C. 154(b) by 911 days.

(21) Appl. No.: 12/086,182

(22) PCT Filed: Nov. 29, 2006

(86) PCT No.: PCT/JP2006/032384
§ 371 (c)(1),
(2), (4) Date: Aug. 5, 2008

(87) PCT Pub. No.: WO2007/066554
PCT Pub. Date: Jun. 14, 2007

(65) Prior Publication Data
US 2009/0250884 A1    Oct. 8, 2009

(30) Foreign Application Priority Data

Dec. 7, 2005 (JP) ................................. 2005-352837

(51) Int. Cl.
*H01R 43/00* (2006.01)
(52) U.S. Cl. .......................................... 29/888.3; 29/460
(58) Field of Classification Search ................ 29/883.3, 29/416, 417, 219, 460, 527.4, 888.3; 277/590, 277/610, 530, 653
See application file for complete search history.

(56) References Cited

U.S. PATENT DOCUMENTS

| | | | | |
|---|---|---|---|---|
| 3,770,480 A | * | 11/1973 | Farnam | 427/177 |
| 3,848,117 A | * | 11/1974 | Saito et al. | 708/801 |
| 5,110,630 A | * | 5/1992 | Abe et al. | 427/327 |
| 5,193,822 A | * | 3/1993 | Bonell et al. | 277/598 |
| 6,553,664 B1 | * | 4/2003 | Schenk | 29/888.3 |

FOREIGN PATENT DOCUMENTS

| | | |
|---|---|---|
| DE | 4223487 A1 | 1/1994 |
| DE | 69108093 T2 | 7/1995 |
| DE | 19739196 A1 | 3/1999 |
| JP | 58-21142 | 4/1983 |
| JP | 22-291089 | 10/1999 |
| JP | 2003-336743 | 11/2003 |

OTHER PUBLICATIONS

Machine Translation of Katsuyuki (JP11291089A) Apr. 14, 1998.*

* cited by examiner

*Primary Examiner* — David Bryant
*Assistant Examiner* — Ryan J Walters
(74) *Attorney, Agent, or Firm* — Bacon & Thomas, PLLC (57) ABSTRACT

A production method of an annular gasket comprising a metal base and an elastic seal layer laminated to each side thereof, comprising the steps of subjecting a metal sheet to punching out process to obtain a plurality of divided constituent members for the metal base, each of the divided constituent member having a slightly wider width than a given gasket width and a predetermined shape for constituting an annular shape of the given gasket, butting these constituent members to temporarily configure the annular shape and bonding the butt parts to each other by welding to form an annular object, subsequently laminating an elastic compound material to each side of the annular object to form elastic seal layers after applying pressurizing process to the annular object, and punching a given shape out of the annular object to obtain the annular gasket.

4 Claims, 7 Drawing Sheets

METHOD OF MANUFACTURING A SEGMENTED METALIZED GASKET

TECHNICAL FIELD

The present invention relates to a production method of an annular gasket being interposed for sealing between the contacting faces of a cylinder block and an oil pan of an internal-combustion engine and a joined portion of several piping, and to a gasket obtained by this production method.

BACKGROUND ART

An annular gasket is interposed between the components to be sealed of an opening such as between the contacting faces of the cylinder block and the oil pan of an internal-combustion engine like automobile engines and a joined portion of several piping. By fastening these components to be sealed, the gasket is interposed by pressure to achieve sealing. Such a gasket is manufactured by punching and processing a rubber sheet, cellulose fiber sheet, cork, cork rubber, or a sheet-like base material which is integrally formed on both faces of a metal base plate with an elastic material such as rubber to be integrated, thereby forming a predetermined annular gasket.

When the sheet-like base material is punched and processed as mentioned above, the inner portion of annular object is discarded as waste. In particular, when an opening area is large and the rate of the inner side portion of the annular object is large like the gasket for oil pan, or the gasket for piping of a large caliber, this waste portion is increased, thereby deteriorating the production yield. The patent document 1 and the patent document 2 disclose a production method of an annular gasket in order to solve such productivity problems in which a sheet-like base material is punched and processed into a plurality of gasket component members and the component members are joined.

The gasket produced by the method of the patent document 1 is made of a compressible gasket material containing much bubble or space therein. Recently, from viewpoints of toughness and durability what is called a metallic gasket has been used as the above-mentioned gasket for oil pan as disclosed in the patent document 2, such gasket is formed by integrating a covering material (seal layer) made of a soft elastic seal material such as rubber on both faces of a metal sheet like a steel plate.

[Patent document 1] JP-58-21142-B
[Patent-document 2] JP-2003-336743-A

DISCLOSURE OF INVENTION

Problems to be Solved in the Invention

In the patent documents 2 a plurality of gasket components obtained by punching out a steel plate as an original plate are temporarily assembled into a desired shape (predetermined gasket form), the joined portion of the gasket components is fixedly integrated by a laser welding to produce an annular metal base plate, then a rubber material containing a compressive fiber is applied on both faces of the metal base plate so as to form a covering material, thereby obtaining the above-mentioned metal gaskets. Thus, since a plurality of gasket components constituting the annular metal base plate are designed to be punched out of a steel plate, the waste of the steel plate as an original plate is decreased and the production yield is improved. However, unevenness peculiar to welding is generated at the joined portion by a laser welding which causes distortion and undulation on a surface area of the metal base plate by the heat generated by welding, and this might become a cause to spoil the sealing ability required for a gasket.

The present invention is proposed in view of the above-mentioned problems, and the object is to provide a production method of a gasket which improves the production yield and does not damage its sealing ability, and to provide a new gasket produced by this method.

Means to Solve the Problems

According to the first aspect of the present invention, the production method of an annular gasket comprising a metal base and an elastic seal layer laminated to each side thereof is comprised of the steps of; subjecting a metal sheet to punching out process to obtain a plurality of divided constituent members for the metal base, each of the divided constituent member having a slightly wider width than a given gasket width and a predetermined shape for constituting an annular shape of the given gasket, butting these constituent members to temporarily configure the annular shape and bonding the butt parts to each other by welding to form an annular object, subsequently laminating an elastic compound material to each side of the annular object to form elastic seal layers after applying pressurizing process to the annular object, and punching a given shape out of the annular object to obtain the annular gasket.

According to the second aspect of the present invention, it is preferable that the welding step is performed by using a laser spot welding method. Further according to the third aspect of the present invention, it is preferable that the elastic compound material is made of a rubber compound material containing a compressive fiber therein, and the elastic seal layer laminating is carried out by the steps of: coating rubber compound material on each side of the annular object, and thereafter vulcanizing the rubber compound material.

According to the fourth aspect of the present invention, a gasket is formed by integrally laminating elastic seal layers on both faces of a metal base which is annularly formed by welding a plurality of divided constituent members for metal base by the methods described in the first to the third aspects of the present invention.

Effect of the Invention

According to the gasket production method of the first aspect of the present invention, a plurality of divided constituent members for a metal base plate punched out a metal sheet as an original plate are butted and temporarily assembled in an annular form, and the butted portion is welded to be connected, thus obtaining an annular object which is a basic form of the metal base plate. Therefore, comparing with the method where the annular object is directly punched out the original plate and pressurized, a waste portion is decreased and the substantial yield productivity is improved drastically. Moreover, after pressurizing this annular object, an elastic compound material is designed to be attached on both faces of the annular object to be integrated to form an elastic seal layer, therefore, the unevenness of the welded butted portion is smoothed by this pressurization processing, and the distortion and undulation caused by the heat at the time of welding are removed. Therefore, there is no unevenness on the surface of the gasket as an end product which is punched and processed into a predetermined gasket form and to which the elastic seal layer is integrally formed, thus obtaining a metallic gasket having toughness and outstanding sealing ability.

If a laser spot welding is made to perform welding connection like the second aspect of the present invention, there is no damage of the welding portion, and there causes only a little possibility of heat distortion, thereby accomplishing precise welding connection. Further, in the subsequent pressurization processing, surface smoothing is made effectively. Laser spot welding is very suitable for joining the metal plates of 0.2-0.6 mm thickness which are used for this kind of gasket, since laser spot welding has only a little influence on the portion other than the welded portion. Moreover, the rubber compound material containing a compressive fiber is used as an elastic compound material, vulcanization processing is carried out after coating the rubber compound material on both faces of the annular object, thereby forming the elastic seal layer, as described in the third aspect of the present invention. In this case, the drift of the rubber material at the time of vulcanization processing is prevented by the compressive fiber and the elastic seal layer is formed simply and exactly. Further, the formed elastic seal layer demonstrates a superior sealing ability with less degradation with the passage of time in addition to the elasticity of rubber material and the reinforcement function of the compressive fiber.

Since the gasket of the fourth aspect of the present invention is obtained by the production method as mentioned in the above-mentioned aspects, it can be offered at low cost by the merit of the production yield. Moreover, since it has the superior characteristic as mentioned above, it is very suitable as an oil pan gasket and a gasket for piping of a large caliber.

BRIEF DESCRIPTION OF DRAWINGS

FIG. 7 shows the measurement result of the outline form of the surface of the annular object.

BEST MODE FOR CARRYING OUT THE INVENTION

Figure 1:
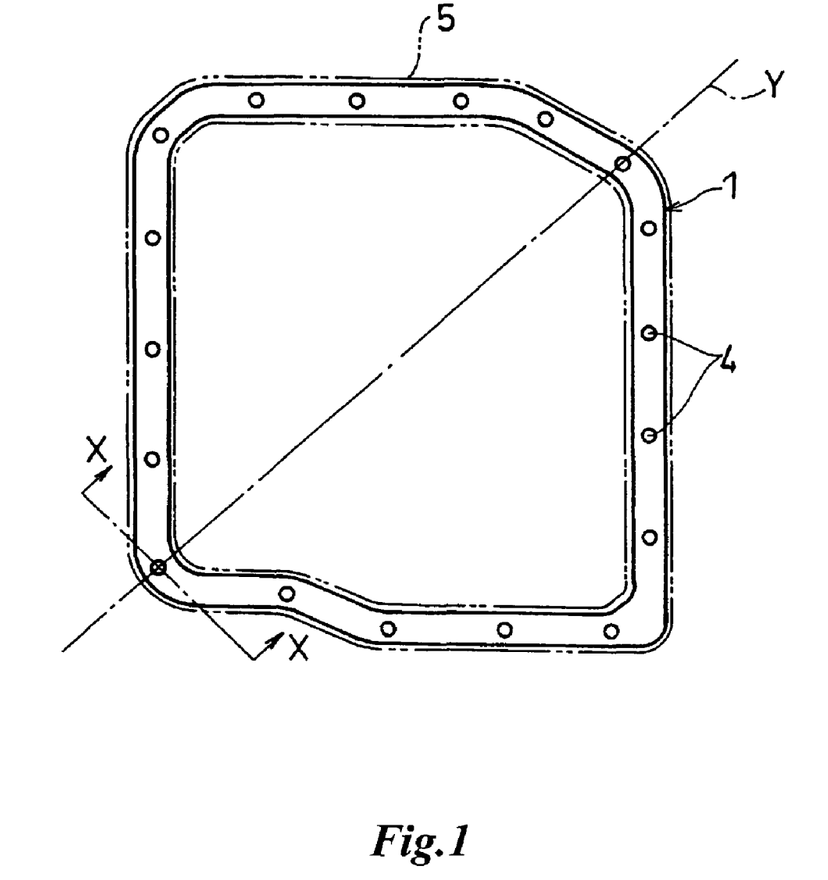
FIG. 1 is a plan view showing one embodiment of the gasket of the present invention.
Figure 3:
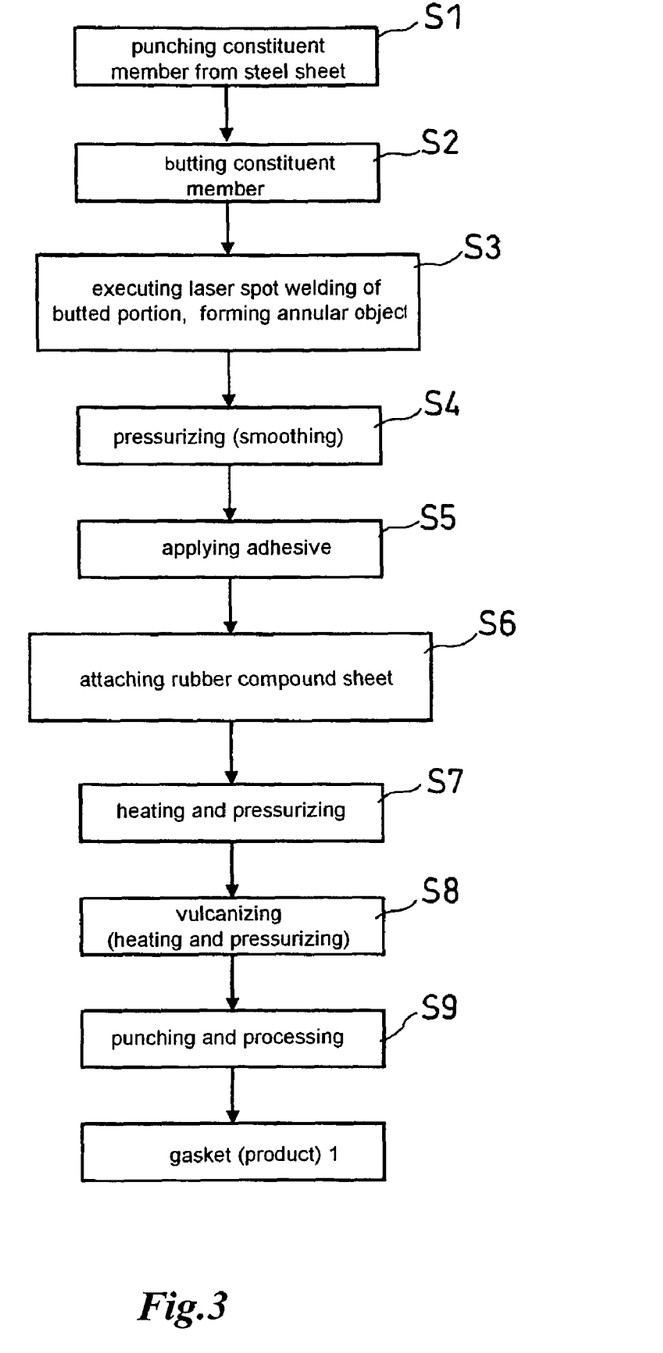
FIG. 3 is a flow chart showing one embodiment of the gasket production method of the present invention.
Figure 4A:
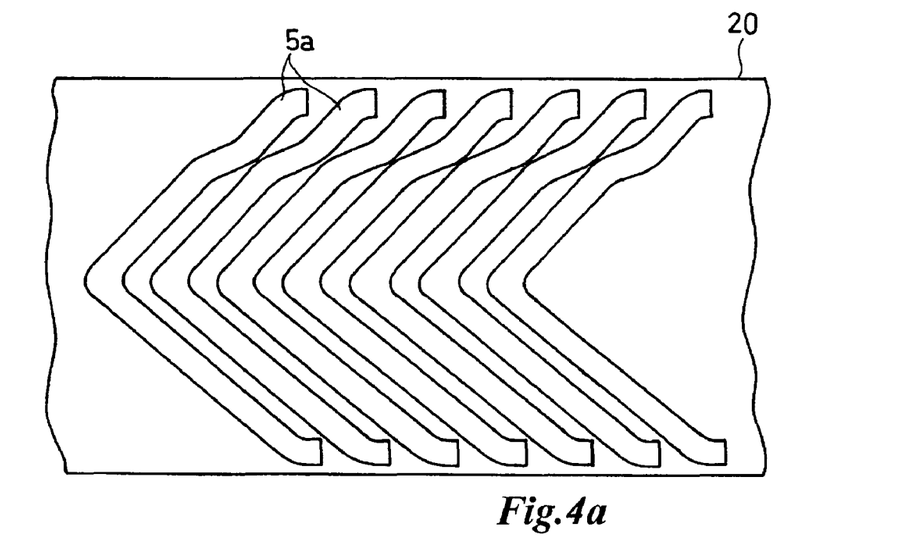
FIG. 4a and FIG. 4b show a punch-out form of divided constituent members for a metal base.
Figure 4B:
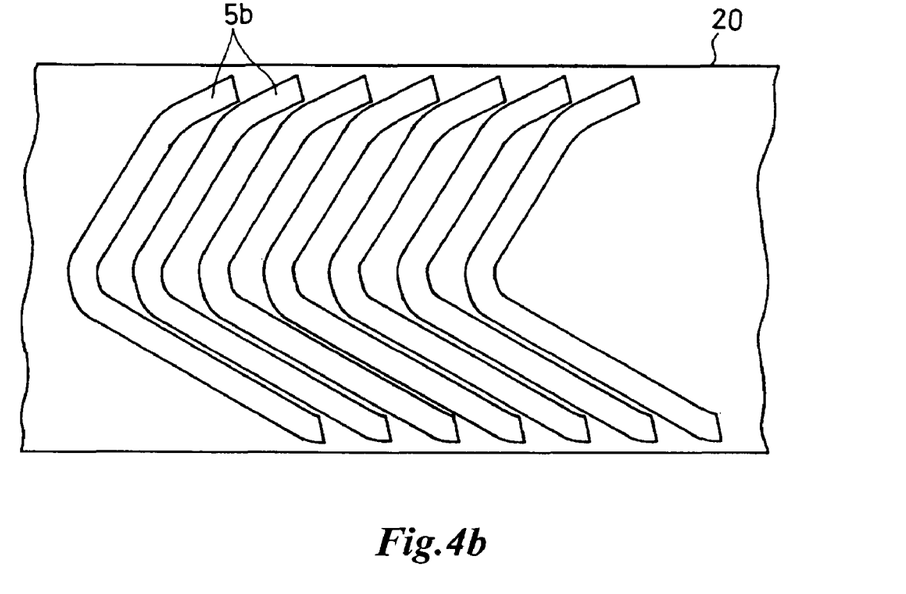
Figure 5:
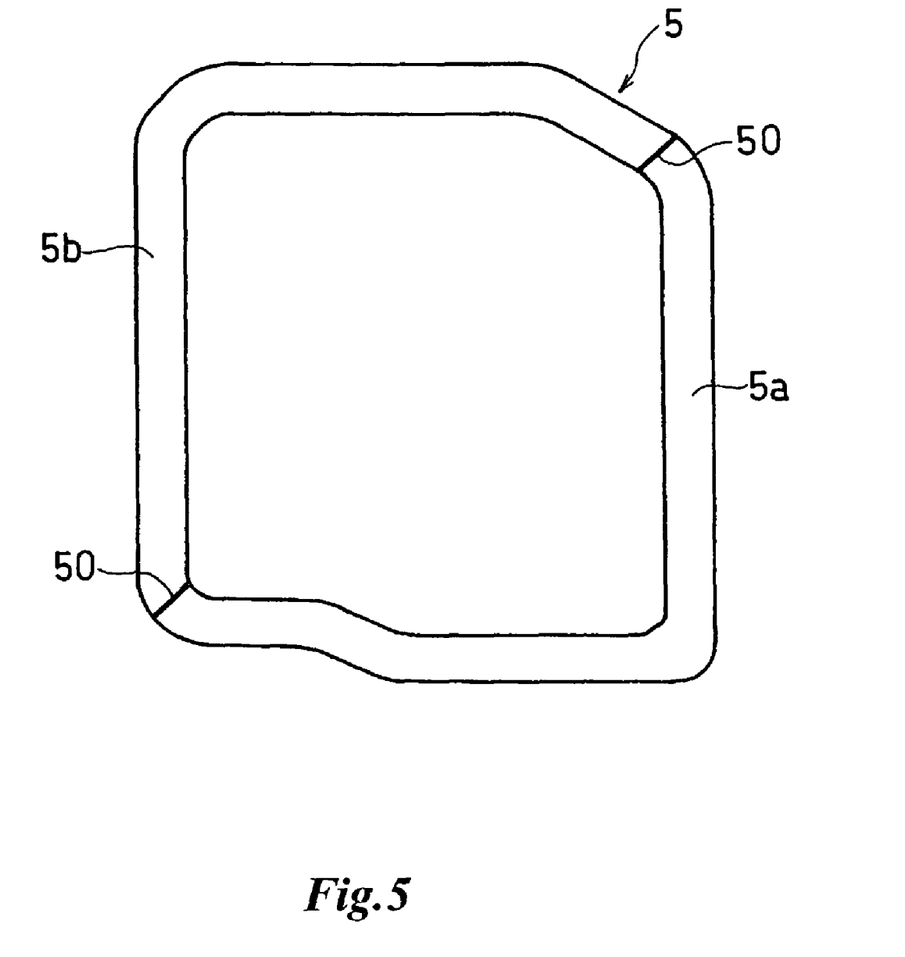
FIG. 5 is a plan view of an annular object formed by butting and welding the components.
Figure 6:
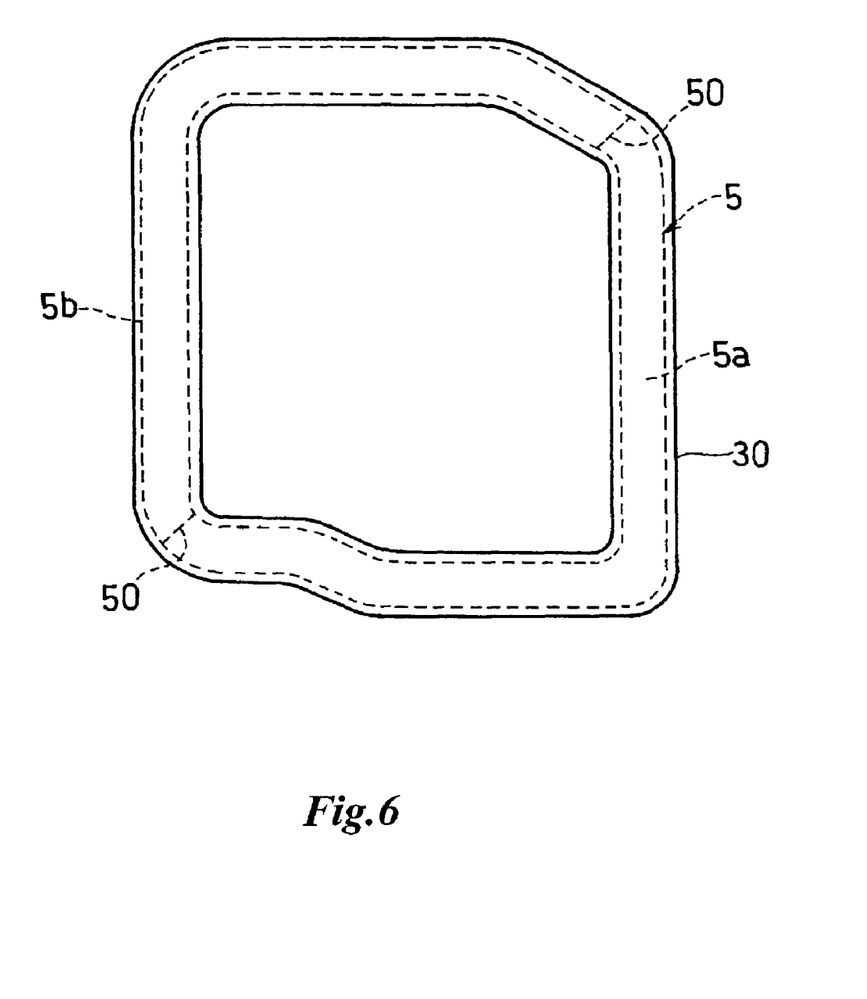
FIG. 6 is a plan view when a rubber compound sheet is attached to an annular object.
Figure 7A:
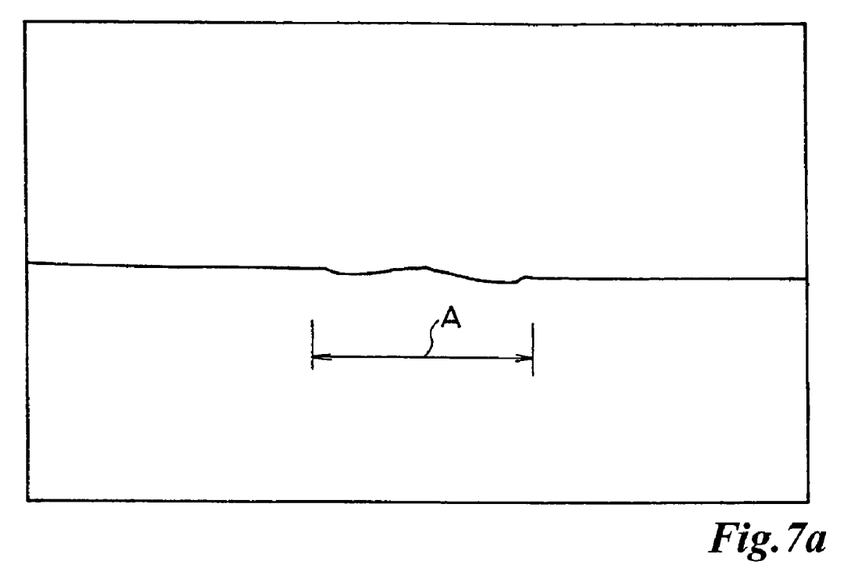
FIG. 7a shows the result before pressurization processing and FIG. 7b shows the result after pressurization processing, respectively.
Figure 7B:
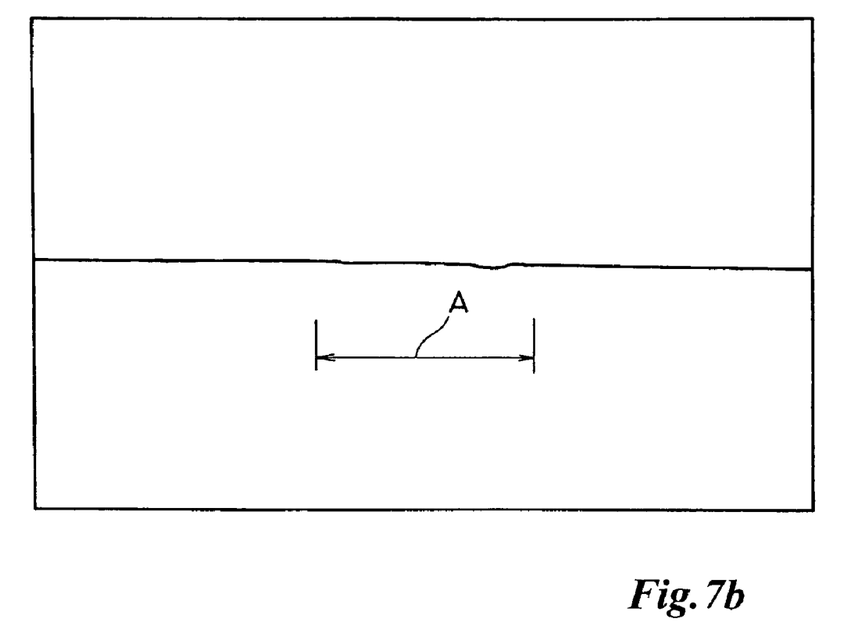

The best mode of the present invention is explained based on the attached drawings. FIG. 1 is a plan view showing one embodiment of the gasket of the present invention, FIG. 2 is an expanded sectional view along the X-X line in FIG. 1, FIG. 3 is a flow chart showing one embodiment of the gasket production method of the present invention, FIG. 4a and FIG. 4b show a punch-out form of the divided constituent members for a metal base, FIG. 5 is a plan view of an annular object formed by butting and welding the components, FIG. 6 is a plan view when a rubber compound sheet is attached to an annular object, and FIG. 7 shows the measurement result of the outline form of the surface of the annular object, FIG. 7a shows the result before pressurization processing and FIG. 7b shows the result after pressurization processing, respectively.
[Embodiment]

Figure 2:
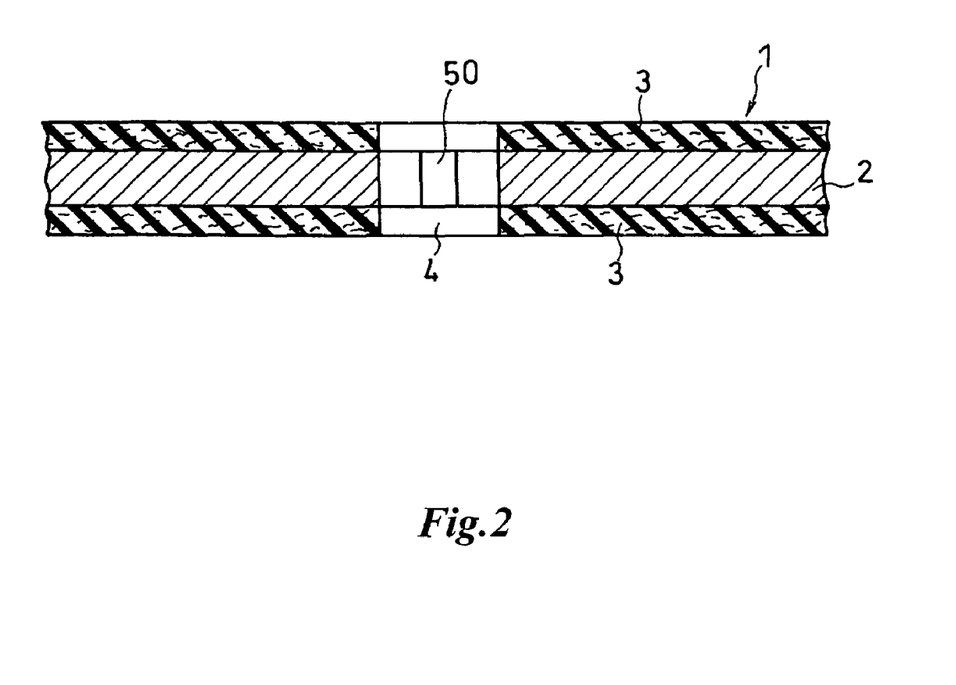
FIG. 2 is an expanded sectional view along the X-X line in FIG. 1.

A gasket 1 in FIG. 1 and FIG. 2 shows an example applied to an oil pan gasket for car motor, and is designed to have a predetermined width and to be in a predetermined annular shape (substantially rectangular) so as to conform with the shape of a peripheral portion of an upper end opening (flange portion) of an unillustrated oil pan. Specifically, the gasket 1 comprises a metal base plate 2 made of a cold-rolling steel plate or a stainless steel plate and an elastic seal layer 3 which is formed by covering and integrating a rubber compound material containing a compressive fiber on both faces of the metal base plate 2. Furthermore, a lot of bolt holes 4 are formed at a suitable interval along the circumferential direction for integrating the oil pan, the cylinder block (not shown) and the gasket 1 interposed therebetween by means of a bolt. The two-point chain line part in FIG. 1 shows the outer shape of the annular object 5 which is formed by welding and connecting divided constituent members 5a and 5b for a metal base plate as mentioned later. Moreover, the one-point chain line Y is a division boundary line of the divided constituent members 5a and 5b for metal base plate in alignment with the diagonal line of the approximately rectangular annular object 5, and the reference numeral 50 in FIG. 2 shows the above-mentioned welded connection part.

The above-mentioned oil pan gasket 1 is manufactured in the following ways. That is, in FIG. 3 to FIG. 6, there provided a plurality of two kinds of above-mentioned divided constituent members for metal base plate (refer to FIG. 1) which are a little broader than a predetermined gasket width and constitutes a predetermined annular form by punching out a steel plate (metal plate) 20 as an original plate as shown in FIG. 4a and FIG. 4b (step S1). The two kinds of members 5a, 5b are butted to be temporarily assembled at the above-mentioned division boundary line Y (step S2) and the butted portion is connected by laser spot welding to form a joined portion 50 (step S3), thereby obtaining the annular object 5 as shown in FIG. 5.

Next, the annular object 5 is pressurized with a pressing machine having suitable pressurization power and is smoothed (step S4). FIG. 7a and FIG. 7b are graphs which show the measured result of the outline form of the surface of the annular object 5 with an outline form measurement machine conte racer, FIG. 7a shows the result before the pressurization processing and FIG. 7b shows that after the pressurization processing. In both graphs, a vertical axis shows the distance from an arbitral reference level in a direction of board thickness and a horizontal axis shows the distance from an arbitrary reference point in a direction of measurement scanning, respectively. The area A in both graphs shows the joined portion 50 by the above-mentioned laser spot welding. It can be understood from the both graphs, the unevenness in the area A before pressurization processing is almost lost after pressurization processing to be smoothed. Further, when there are heat distortion and undulation at the time of welding, it is removed by this pressurization processing.

Then, adhesive agent is applied to both faces of the annular object 5 smoothed by pressurization processing as mentioned above (step S5), and a rubber compound sheet (rubber compound material) 30 prepared in advance is attached on both faces of the annular object 5 as shown in FIG. 6 (step S6). This rubber compound sheet 30 is formed such that a compressive organic fibers other than asbestos and/or a compressive inorganic fiber, filler etc. are mixed with an unvulcanized rubber material, the mixture is extended in a form of a sheet with about 0.2 mm thickness, and the formed sheet is punched out in an annular form with a little broader width than the annular object 5. In this punching process, since the rubber material is not vulcanized, reuse of a waste portion is possible.

As a compressive fiber here, glass fiber, ceramic fiber, rock wool, slag cotton, fused quartz fiber, whisker, boron fiber, carbon fiber, etc. are adopted. On the other hand, rubber material may be nitril butadiene rubber (NBR) styrene-butadiene rubber (SBR), isobutylene rubber (IR), chloroprene rubber (CR), butadiene rubber (BR), isobutylene-isoprene rubber (IIR), ethylene-propylene rubber (EPM), fluorocarbon rubber (FPM), silicone rubber (Si), etc. Any one of them may be used or they may be mixed with the above-mentioned compressive fiber.

The annular object 5 on which the rubber compound sheet 30 is attached is heated and pressurized to bond and coat the rubber compound sheet 30 on the surface of the annular object (step S7). Further, the rubber material of the rubber compound sheet 30 is vulcanized by heating and pressurizing so that the rubber compound sheet 30 is bonded and integrated on both faces of the annular object 5, thereby forming the elastic seal layer 3 (see FIG. 2) (step S8). Then, a predetermined gasket form is punched therefrom at a time including the above-mentioned bolt holes 4 (step 9) and the oil pan gasket 1 as shown with the solid line of FIG. 1 is obtained.

In such a manufacturing process, the above-mentioned members 5a and 5b are shaped like the letter "L", and a plurality of members 5a and 5b can be punched, in a manner they are closely positioned, from the steel plate 20 as an original plate as shown in FIG. 4, and there are few waste portions compared with the case where the annular object 5 is directly punched, thereby extremely improving the productivity yield. Moreover, since these members 5 and 5b are joined by laser spot welding and are formed into the annular object 5 corresponding to a predetermined gasket form, this formation is made simply and exactly. The formed annular object 5 is smoothed by pressurization process to eliminate unevenness at the welding portion. Therefore, unevenness which prevents sealing ability is not appeared on the surface, thereby obtaining the oil pan gasket 1 having enough toughness and sealing function.

In addition, in the above-mentioned embodiment, since the bolt hole 4 is formed at the welded portion 50 and the pressure at the bolted portion is increased, it is preferable to adjust the bolt hole 4 into the welding portion 50 in this way, but the present invention is not limited to this embodiment. Moreover, the shape of the oil pan gasket 1 is not limited to the one shown in the figures but other shapes can be used, and the division mode (a division position and the division number) of the annular object 5 is not limited to the one shown in the figures. And although the oil pan gasket is used in the above-mentioned embodiment, however, it goes without saying that this invention can be also applied to the gasket for piping of a large caliber and other gaskets.

The invention claimed is:

1. A production method of an annular gasket comprising a metal base and an elastic seal layer laminated to each side thereof, comprising the steps of;
    subjecting a metal sheet to a punching out process to obtain a plurality of divided constituent members, each of said divided constituent members having a slightly wider width than a width of said annular gasket to be produced and a predetermined shape for constituting an annular shape,
    butting these constituent members to temporarily configure said annular shape and bonding the butted parts to each other by welding to form an annular object,
    subsequently carrying out an elastic seal layer laminating by attaching an elastic compound material to both sides of said annular object to form elastic seal layers after smoothing is performed by applying a pressurizing process to the welded parts of said annular object with a pressing machine in order to lose the unevenness made in the process of welding and
    punching a given shape out of said annular object to obtain said annular gasket.

2. The production method of an annular gasket as set forth in claim 1, wherein said welding step is performed by using a laser spot welding method.

3. The production method of an annular gasket as set forth in claim 2, wherein said elastic compound material is made of a rubber compound material containing a compressive fiber therein, and
    said elastic seal layer laminating is carried out to form said elastic seal layers by carrying out the steps of: coating unvulcanized rubber compound material on said annular object after said smoothing, and thereafter vulcanizing said rubber compound material.

4. The production method of an annular gasket as set forth in claim 1, wherein said elastic compound material is made of a rubber compound material containing a compressive fiber therein, and
    said elastic seal layer laminating is carried out to form said elastic seal layers by carrying out the steps of: coating unvulcanized rubber compound material on said annular object after said smoothing, and thereafter vulcanizing said rubber compound material.

* * * * *